(12) United States Patent
Park et al.

(10) Patent No.: US 12,174,371 B2
(45) Date of Patent: Dec. 24, 2024

(54) FOLDABLE DISPLAY DEVICE

(71) Applicant: Samsung Display Co., Ltd., Yongin-Si (KR)

(72) Inventors: Dong Jin Park, Seongnam-si (KR); Han Sun Ryou, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 1099 days.

(21) Appl. No.: 16/551,648

(22) Filed: Aug. 26, 2019

(65) Prior Publication Data
US 2020/0132989 A1   Apr. 30, 2020

(30) Foreign Application Priority Data
Oct. 31, 2018   (KR) .................. 10-2018-0132036

(51) Int. Cl.
| | | |
|---|---|---|
| *G02B 27/00* | (2006.01) | |
| *G02B 5/00* | (2006.01) | |
| *G02F 1/135* | (2006.01) | |
| *H05K 5/00* | (2006.01) | |

(52) U.S. Cl.
CPC ......... *G02B 27/0081* (2013.01); *G02B 5/003* (2013.01); *G02F 1/1351* (2021.01); *H05K 5/0017* (2013.01)

(58) Field of Classification Search
None
See application file for complete search history.

(56) References Cited

U.S. PATENT DOCUMENTS

| | | | |
|---|---|---|---|
| 8,213,082 B2 | 7/2012 | Gaides et al. | |
| 9,176,535 B2 | 11/2015 | Bohn et al. | |
| 9,348,369 B2 | 5/2016 | Kee et al. | |
| 9,582,043 B2 | 2/2017 | Hirakata | |
| 10,139,660 B2 | 11/2018 | Hirakata | |
| 10,159,135 B2 | 12/2018 | Ikeda et al. | |
| 10,168,844 B2 | 1/2019 | Kwon et al. | |
| 10,261,546 B2 | 4/2019 | Park et al. | |
| 10,290,685 B2 * | 5/2019 | Oh ........................ G06F 3/0412 | |
| 10,368,452 B2 * | 7/2019 | Yun ........................ H10K 77/111 | |
| 10,613,362 B2 | 4/2020 | Hirakata | |

(Continued)

FOREIGN PATENT DOCUMENTS

| | | |
|---|---|---|
| CN | 101903809 A | 12/2010 |
| CN | 104081258 A | 10/2014 |

(Continued)

OTHER PUBLICATIONS

US 11,409,147 B2, 08/2022, Hirakata (withdrawn)

(Continued)

*Primary Examiner* — Chris H Chu
(74) *Attorney, Agent, or Firm* — Innovation Counsel LLP (57) ABSTRACT

A foldable display device may include a display panel, first-set light control members, and second-set light control members. The display panel may include a first display portion, a second display portion, and a folding portion disposed between the first display portion and the second display portion. The first-set light control members may overlap the first display portion and may extend parallel to each other. The second-set light control members may overlap the second display portion and may extend parallel to each other.

13 Claims, 7 Drawing Sheets

(56) References Cited

U.S. PATENT DOCUMENTS

| | | | |
|---|---|---|---|
| 10,761,664 B2 | 9/2020 | Kwon et al. | |
| 10,764,973 B2 | 9/2020 | Ikeda et al. | |
| 11,061,264 B2 | 7/2021 | Hirakata | |
| 11,327,616 B2 | 5/2022 | Kwon et al. | |
| 2008/0211990 A1* | 9/2008 | Sakai | G02F 1/1323 |
| | | | 315/210 |
| 2015/0043084 A1 | 2/2015 | Snyder et al. | |
| 2015/0091434 A1* | 4/2015 | Kim | H10K 77/111 |
| | | | 313/504 |
| 2016/0378224 A1 | 12/2016 | Kwon et al. | |
| 2017/0082894 A1* | 3/2017 | Katsuta | G02F 1/1337 |
| 2017/0201742 A1 | 7/2017 | Song et al. | |
| 2018/0181165 A1* | 6/2018 | Park | H01L 27/3272 |
| 2018/0217433 A1* | 8/2018 | Tang | G02F 1/133305 |
| 2019/0129541 A1 | 5/2019 | Kwon et al. | |
| 2019/0137773 A1 | 5/2019 | Song et al. | |
| 2019/0258120 A1 | 8/2019 | You et al. | |
| 2020/0396807 A1 | 12/2020 | Ikeda et al. | |
| 2020/0401251 A1 | 12/2020 | Kwon et al. | |

FOREIGN PATENT DOCUMENTS

| | | | | |
|---|---|---|---|---|
| CN | 104991349 A | 10/2015 | | |
| CN | 105493169 A | 4/2016 | | |
| CN | 106537486 A | 3/2017 | | |
| CN | 106855675 A | 6/2017 | | |
| CN | 107425037 A | 12/2017 | | |
| CN | 108242461 A | 7/2018 | | |
| JP | 2014-238513 A | 12/2014 | | |
| KR | 20140093323 A | * | 7/2014 | G02B 27/2214 |
| KR | 10-2015-0047356 A | 5/2015 | | |
| KR | 10-2016-0046139 A | 4/2016 | | |
| KR | 10-2016-0070595 A | 6/2016 | | |
| KR | 10-2016-0075206 A | 6/2016 | | |
| KR | 10-1678189 A | 11/2016 | | |
| KR | 10-2017-0001935 A | 1/2017 | | |
| KR | 10-2018-0004380 A | 1/2018 | | |
| KR | 10-2018-0075779 A | 7/2018 | | |
| WO | 2012167204 A2 | 12/2012 | | |
| WO | 2015126068 A1 | 8/2015 | | |

OTHER PUBLICATIONS

Chinese Office Action corresponding to Application No. 201911051909.9 and issued on Aug. 2, 2022, 8 pages.

Chinese Office Action corresponding to Application No. 201911051909.9 and issued on Feb. 15, 2023, 9 pages.

* cited by examiner

FOLDABLE DISPLAY DEVICE

CROSS-REFERENCE TO RELATED APPLICATION

This application claims priority to and the benefit of Korean Patent Application No. 10-2018-0132036 filed in the Korean Intellectual Property Office on Oct. 31, 2018; the entire contents of the Korean Patent Application are incorporated herein by reference.

BACKGROUND

(a) Technical Field

The technical field relates to a foldable display device.

(b) Description of the Related Art

A foldable display device may include a display panel for displaying an image according to input signals. The display panel may include a flexible portion. The display panel can be folded and unfolded at the flexible portion.

The above information disclosed in this Background section is for enhancement of understanding of the background of this application. This Background section may contain information that does not form the prior art that is already known in this country to a person of ordinary skill in the art.

SUMMARY

Embodiments may be related to a foldable display device that can protect privacy of a user, can prevent images from overlapping, and/or can prevent image from being unwantedly viewed.

An embodiment provides a foldable display device including: a display panel configured to include a first display portion, a second display portion, and a folding portion disposed between the first display portion and the second display portion; and a light control film configured to overlap between the first display portion and the second display portion, wherein the light control film may include a plurality of light control parts overlapping the first display portion and the second display portion, the plurality of light control parts may be spaced apart from each other, the plurality of light control parts overlapping the first display portion may extend to be parallel to each other, and the plurality of light control parts overlapping the second display portion may extend to be parallel to each other.

The display panel may be folded at the folding portion to be in an out-folding state and an in-folding state.

The plurality of light control parts may include a black resin.

In the out-folding state of the display panel, the plurality of light control parts overlapping the first display portion and the plurality of light control parts overlapping the second display portion may overlap each other so as to cross each other.

The plurality of light control parts overlapping the first display portion and the plurality of light control parts overlapping the second display portion may obliquely extend in the same direction.

The plurality of light control parts overlapping the first display portion and the plurality of light control parts overlapping the second display portion may extend in crossing directions to be perpendicular to each other.

The plurality of light control parts may overlap the folding portion.

The plurality of light control parts overlapping the first display portion, the plurality of light control parts overlapping the second display portion, and the plurality of light control parts overlapping the folding portion may obliquely extend in the same direction.

The plurality of light control parts overlapping the first display portion and the plurality of light control parts overlapping the second display portion may extend in crossing directions to be perpendicular to each other, and the plurality of light control parts overlapping the second display portion and the plurality of light control parts overlapping the folding portion may extend in the same direction.

The plurality of light control parts overlapping the first display portion and the plurality of light control parts overlapping the second display portion may extend in crossing directions to be perpendicular to each other, and the plurality of light control parts overlapping the first display portion and the plurality of light control parts overlapping the folding portion may extend in the same direction.

The light control film may include a base film, and a transparent film disposed on one surface of the base film and including a plurality of grooves, and the plurality of light control parts may be respectively disposed in the plurality of grooves.

The display panel may be a transparent display panel.

An embodiment may be related to a foldable display device. The foldable display device may include a display panel, first-set light control members, and second-set light control members. The display panel may include a first display portion, a second display portion, and a folding portion disposed between the first display portion and the second display portion. The first-set light control members may overlap the first display portion and may extend parallel to each other. The second-set light control members may overlap the second display portion and may extend parallel to each other.

The first-set light control members and the second-set light control members may be positioned between the first display portion and the second display portion when the display panel is in a first folded state. The first display portion and the second display portion may be positioned between the first-set light control members and the second-set light control members when the display panel is in a second folded state.

Each of the first-set light control members includes a black resin.

When the first-set light control members and the second-set light control members are positioned between the first display portion and the second display portion, the first-set light control members may cross (i.e., may intersect) the second-set light control members in a plan view of the foldable display device.

When the display panel is unfolded, the first-set light control members may extend parallel to the second-set light control members and may extend obliquely relative to an edge of the display panel.

The first-set light control members may extend perpendicular to the second-set light control members.

The foldable display device may include third-set light control members. The third-set light control members may overlap the folding portion and may extend parallel to each other.

When the display panel is unfolded, the first-set light control members may extend parallel to the second-set light control members, may extend parallel to the third-set light control members, and may extend obliquely relative to an edge of the display panel.

A first edge of the display panel may be longer than a second edge of the display panel. The first-set light control members may extend perpendicular to the first edge of the display panel. The second-set light control members may extend parallel to the first edge of the display panel. The third-set light control members may extend parallel to first edge of the display panel.

A first edge of the display panel may be longer than a second edge of the display panel. The first-set light control members may extend perpendicular to the first edge of the display panel. The second-set light control members may extend parallel to the first edge of the display panel. The third-set light control members may extend perpendicular to the first edge of the display panel.

The foldable display device may include a transparent film. The transparent film may overlap the first display portion and may include first-set grooves. The first-set light control members may be respectively disposed inside the first-set grooves.

The transparent film may further overlap the folding portion.

The foldable display device may include a base film. The base film may be formed of a polymer material. The first-set light control members may be positioned between the base film and the first display portion.

The base film may overlap the first display portion and may overlap the folding portion.

Portions of the transparent film may be positioned between the first-set light control members and the base film, may directly contact the first-set light control members, and may directly contact the base film.

The foldable display device may include an adhesive layer. The adhesive layer may be positioned between the first-set light control members and the first display portion. The adhesive layer may directly contact at least one of the first-set light control members and the transparent film.

The adhesive layer may directly contact the first-set light control members and may directly contact the transparent film.

The foldable display may include an adhesive layer. The adhesive layer may be positioned between the first-set light control members and the first display portion and may directly contact the first-set light control members.

The adhesive layer may overlap the first display portion and may overlap the folding portion.

The display panel may be a transparent display panel. The first-set light control members may be/include light blockers and/or light absorbers.

Embodiments may protect privacy of a user of a foldable display device, may prevent images displayed by a foldable display device from overlapping, and/or may prevent images displayed by a foldable display device from being unwantedly viewed.

DETAILED DESCRIPTION OF EMBODIMENTS

Embodiments are described with reference to the accompanying drawings. As those skilled in the art would realize, the described embodiments may be modified in various ways.

Like reference numerals may designate like elements in specification.

In the drawings, thicknesses of layers, films, panels, regions, etc., may be exaggerated for clarity.

Although the terms "first," "second," etc. may be used herein to describe various elements, these elements, should not be limited by these terms. These terms may be used to distinguish one element from another element. Thus, a first element may be termed a second element without departing from teachings of one or more embodiments. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or at least one intervening element may be present between the first element and the second element. When a first element is referred to as being "directly on" a second element, there are no intended intervening elements (except environmental elements such as air) present between the first element and the second element.

Unless explicitly described to the contrary, the word "comprise" and variations such as "comprises" or "comprising" may imply the inclusion of stated elements but not the exclusion of any other elements.

The term "folding state" may mean "folded state"; the term "light control part" may mean "light control member."

Figure 1:
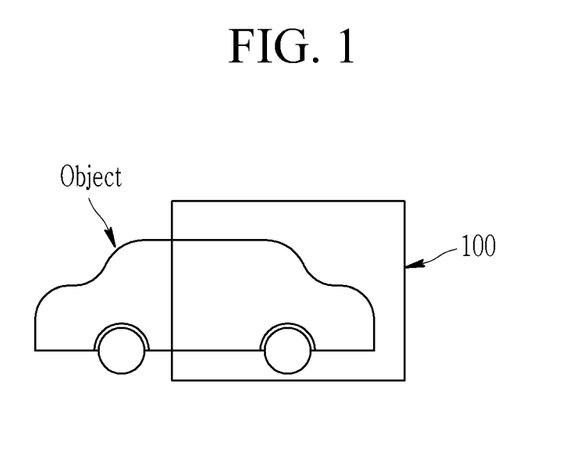
FIG. 1 illustrates a schematic view of a display device according to an embodiment.

FIG. 1 illustrates a schematic view of a display device according to an embodiment.

Referring to FIG. 1, a display device 100 may transmit an image of an object or a background positioned behind the display device 100 as a transparent window does. The display device 100 may be a transparent display device. The transparent display device 100 may be utilized as/in a showcase, a vehicle windshield/window, a building window, or the like. The transparent display device 100 may provide information without substantially blocking a background. The transparent display device 100 may be applied to combine displayed images with various objects and/or interactive contents. For example, images displayed by the transparent display device 100 may be combined with objects presented by augmented reality technology.

Figure 2:
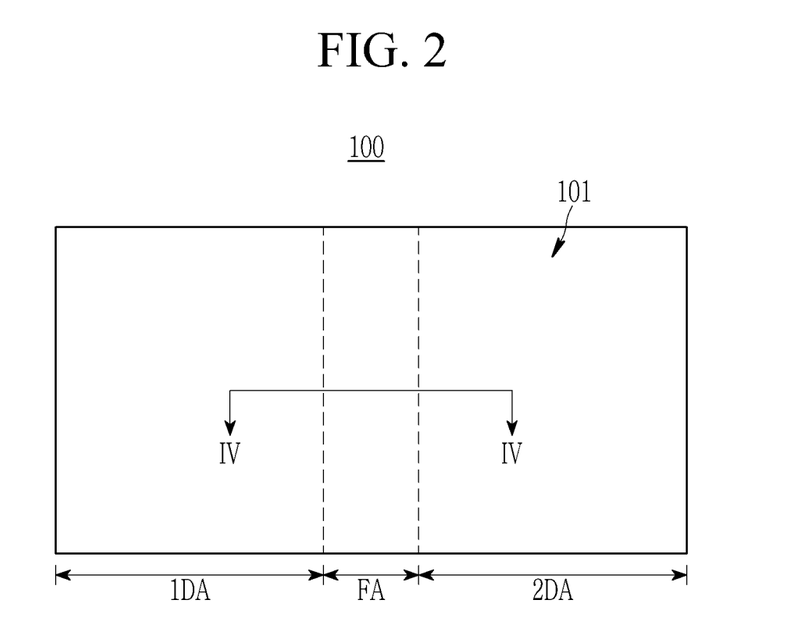
FIG. 2 illustrates a schematic plan view of a front surface of the display device of FIG. 1 in an unfolded state according to an embodiment.
Figure 3:
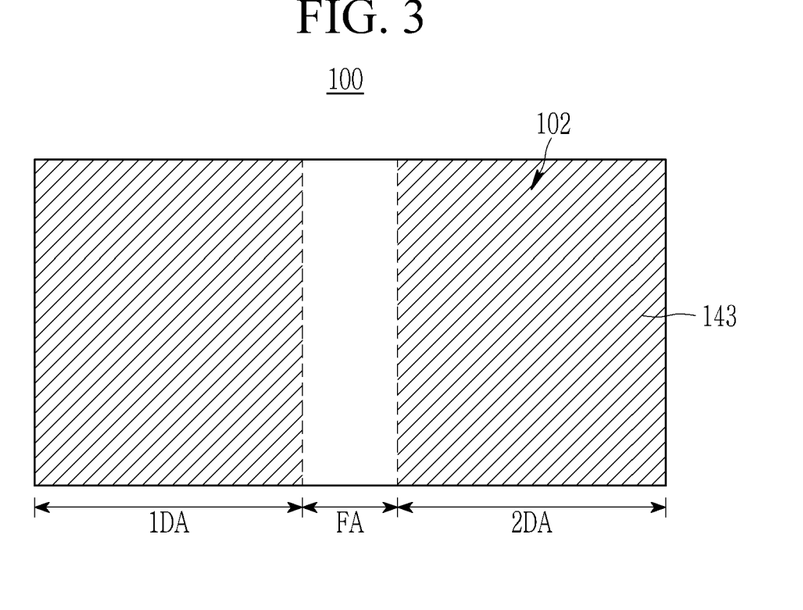
FIG. 3 illustrates a schematic plan view of a rear surface of the display device of FIG. 1 in an unfolded state according to an embodiment.
Figure 4:
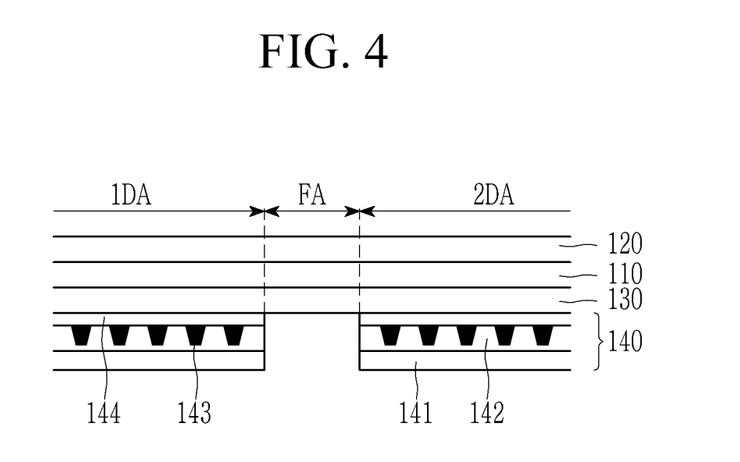
FIG. 4 schematically illustrates a cross-sectional view taken along line IV-IV of FIG. 2 according to an embodiment.
Figure 5:
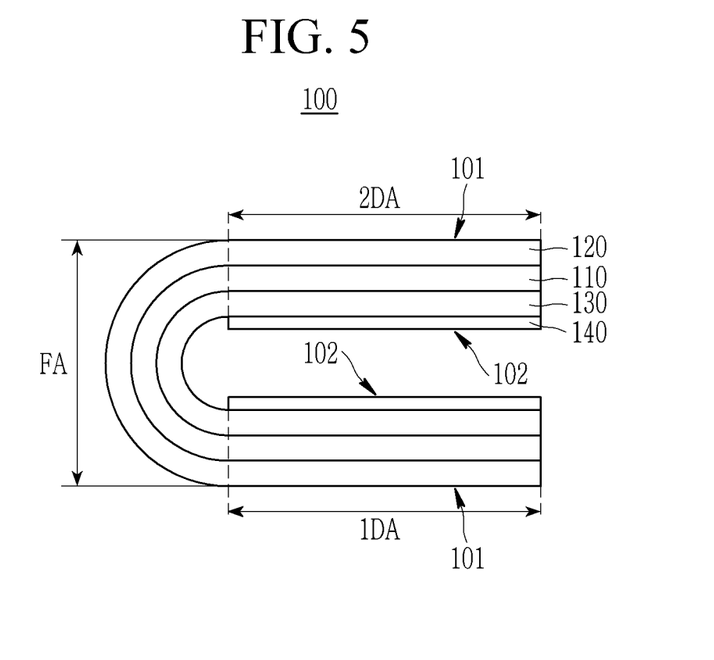
FIG. 5 illustrates a schematic side view of the display device of FIG. 1 in a first folded state according to an embodiment.
Figure 6:
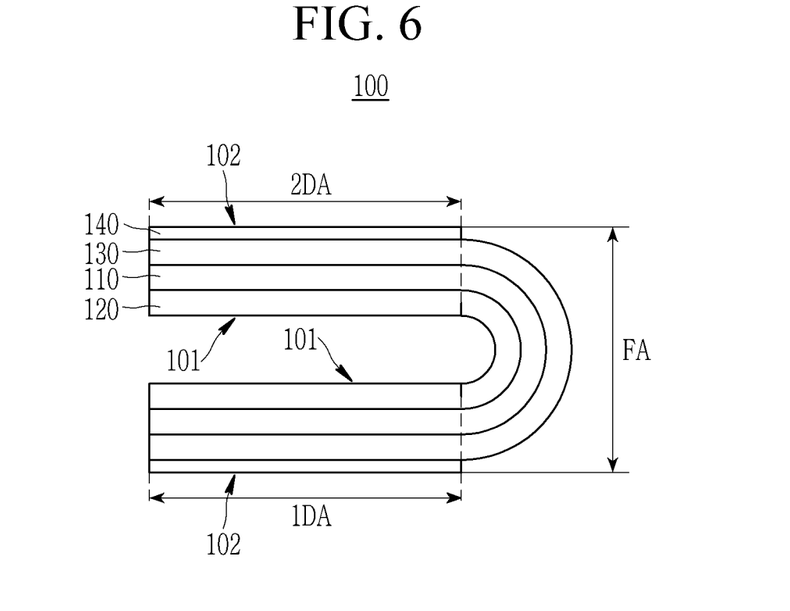
FIG. 6 illustrates a schematic side view of the display device of FIG. 1 in a second folded state according to an embodiment.

FIG. 2 illustrates a schematic plan view of a front surface of the display device of FIG. 1 in an unfolded state according to an embodiment. FIG. 3 illustrates a schematic plan view of a rear surface of the display device of FIG. 1 in the unfolded state according to an embodiment. FIG. 4 schematically illustrates a cross-sectional view taken along line IV-IV of FIG. 2 according to an embodiment. FIG. 5 illustrates a schematic side view of the display device of FIG. 1 in a first folded state according to an embodiment. FIG. 6 illustrates a schematic view of the display device of FIG. 1 in a second folded state according to an embodiment.

Referring to FIG. 2 to FIG. 6, the display device 100 includes a first display portion 1DA and a second display portion 2DA for displaying two images or two portions of an image. The first display portion 1DA and the second display portion 2DA may display the same image or different images, and may be independently turned on and turned off. For example, the first display portion 1DA is turned on to display an image, and the second display portion 2DA is turned off to not display an image.

In addition, the display device 100 includes a folding portion FA disposed between the first display portion 1DA and the second display portion 2DA. An image or a portion of an image may also be displayed in the folding portion FA. A single image may be displayed cooperatively by the first display portion 1DA, the second display portion 2DA, and the folding portion FA.

In the display device 100, an image is displayed on a front surface 101, and light control parts 143 are disposed on a rear surface 102. Two subsets of the light control parts 143 may respectively overlap and/or correspond to the first display portion 1DA and the second display portion 2DA.

The display device 100 may be unfolded and may be substantially flat as shown in FIG. 2 and FIG. 3, and may be folded as shown in FIG. 5 and FIG. 6.

Folding of the display device 100 may be performed at the folding portion FA. As shown in FIG. 5, the front surface 101 of the display device 100 in which an image is displayed may be folded so that portions of the front surface 101 at the display portions 1DA and 2DA may face away from each other. Such folding is referred to as an out-folding state or a first folding/folded state. In the first folded state, portions the rear surface 102 of the display device 100 at the display portions 1DA and 2DA may face each other and may be positioned between the above-mentioned portions of the front surface 101.

As shown in FIG. 6, the front surface 101 of the display device 100 in which an image is displayed may be folded so that portions of the front surface 101 at the display portions 1DA and 2DA may face each other. Such folding is referred to as an in-folding state or a second folding/folded state. In the second folded state, portions of the rear surface 102 of the display device 100 at the display portions 1DA and 2DA may face away from each other.

The display device 100 may be in the unfolded state or the first folding state while a user is using it to view images, or may be in the second folding state when the user is not using it to view images.

The display device 100 includes a display panel 110, a passivation film 120, a supporting member 130, and light control films 140. The passivation film 120 is disposed on the front surface 101 of the display device 100, and the light control films 140 are disposed on the rear surface 102 of the display device 100.

The display panel 110 may display an image according to input signals. The display panel 110 includes a first display portion 1DA, a second display portion 2DA, and a folding portion FA respectively corresponding to the first display portion 1DA, the second display portion 2DA, and the folding portion FA of the display device 100. The display panel 110 is a flexible panel that may be folded at the folding portion FA. The display panel 110 may include a touch sensor layer, such as a touch film, a touch sheet, or a touch pad, for sensing a touch operation.

The passivation film 120 is disposed on the display panel 110. The passivation film 120 serves to protect and support the display panel 110 from external shocks and foreign substances. The passivation film 120 may be transparent and may have transmittance such that an image displayed on the display panel 110 is well transmitted and an object or background positioned behind the display device 100 may be viewed. The passivation film 120 may include a flexible material that may be folded at the folding portion FA.

The supporting member 130 is disposed under the display panel 110. The supporting member 130 protects the display panel 110 while the display panel 110 is manufactured. The supporting member 130 may be transparent and may have transmittance such that an object or background behind the display device 100 may be viewed. The supporting member 130 may include a flexible material that may be folded at the folding portion FA.

The light control films 140 are disposed below the supporting member 130, and overlap the first display portion 1DA and the second display portion 2DA. The light control films 140 are not disposed in the folding portion FA. A light control film 140 includes a base film 141, a transparent film 142, a plurality of light control parts 143 (or light control members 143), and an adhesive layer 144.

The base film 141 may include polyimide (PI) or polyethylene terephthalate (PET). The transparent film 142 is disposed on the base film 141, and a plurality of grooves is disposed in an upper portion of the transparent film 142. A light control part 143 is disposed inside each groove of the transparent film 142. Each light control part 143 may fill a corresponding groove of the transparent film 142. The adhesive layer 144 is disposed (directly) on the transparent film 142 and the light control part 143, and may be adhered to the supporting member 130.

The light control parts 143 are spaced from each other and extend parallel to each other. Each light control part 143 extends obliquely with respect to at least an edge of a light control film 140, at least an edge or the display panel 110, and/or at an edge of the display device 100 in a plan view of the display device 100. In an embodiment, each light control part 143 is inclined (and/or oriented) at about 45 degrees with respect to the edge of the light control film 140 in the plan view of the display device 100. Light control parts 143 (or first-set light control members) overlapping the first display portion 1DA and light control parts 143 (or second-set light control members) overlapping the second display portion 2DA obliquely extend in the same direction. In an embodiment, the light control parts 143 overlapping the first display portion 1DA extend parallel to each other, and the light control parts 143 overlapping the second display portion 2DA extend parallel to each other. Each light control part 143 may include a material of one or more of various colors to block progress/transmission of light. For example, a light control part 143 may be/include a black resin.

The light control parts 143 may control the progress/transmission of the light outputted from the display panel 110. The light outputted from the display panel 110 may be outputted in various directions through a display surface, and the light outputted from the display panel 110 may be outputted through the light control parts 143 in one or a few predetermined directions. For example, as shown in FIG. 2 and FIG. 3, when the display device 100 is in the unfolded state, an image is viewed from the front face 101 of the display device 100, and the image is not substantially viewable from lateral sides of the rear face 102 of the display device 100.

In FIG. 2 to FIG. 6, it is illustrated that the light control films 140 are disposed on the rear surface 102 of the display device 100. In an embodiment, one or more light control films 140 may be disposed on the front surface 101 of the display device 100. The light control film(s) 140 may be adhered to the passivation film 120 by one or more adhesive layers 144. When the display device 100 is unfolded, no image is substantially viewable from positions beyond lateral sides of the front face 101 of the display device 100.

Since the light control part 143 may control the progress/transmission of the light outputted from the display panel 110, privacy of a user of the display device 100 may be protected.

Figure 7:
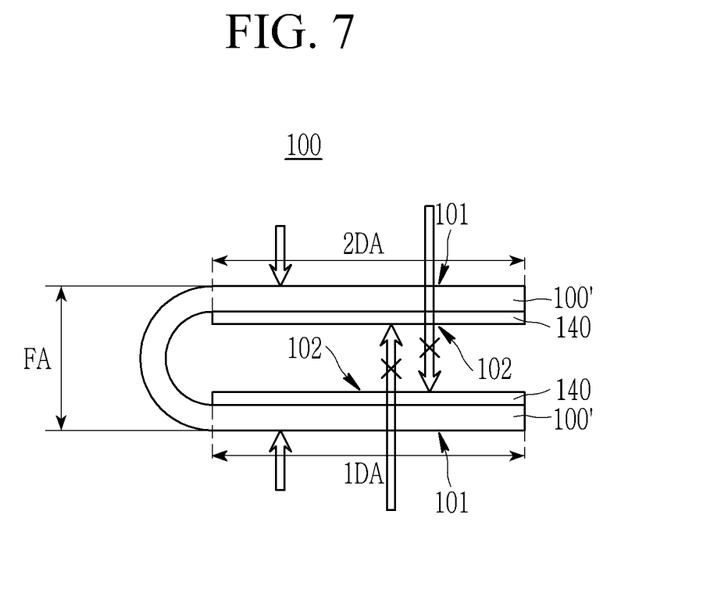
FIG. 7 is a schematic side view schematically showing whether and how a displayed image is viewable when a display device is in a first folding/folded state according to an embodiment.
Figure 8:
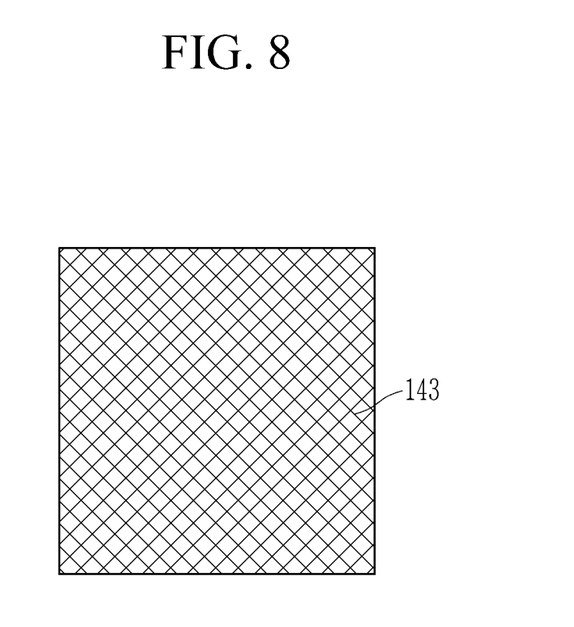
FIG. 8 is a schematic plan view schematically showing that first-set light control parts cross second-set light control parts when a display device is in a first folded state according to an embodiment.

FIG. 7 is a schematic view schematically showing whether and how a displayed image is viewable when a display device is in a first folded according to an embodiment. FIG. 8 is a schematic plan view schematically showing that first-set light control parts cross second-set light control parts when a display device is in a first folded state according to an embodiment. In FIG. 7, a combination of the display panel 110, the passivation film 120, and the supporting member 130 is denoted by reference numeral 100'.

As shown in FIG. 7 and FIG. 8, in the first folding state of the display device 100, portions of the image-displaying front surface 101 of the display device 100 at the display portions 1DA and 2DA face away from each other, and portions of the rear surface 102 of the display device 100 at the display portions 1DA and 2DA face each other. As the light control film 140 disposed at the display portion 1DA face the light control film 140 disposed at the second display portion 2DA, the light control parts 143 disposed at the first display portion 1DA cross the light control parts 143 disposed at the second display portion 2DA in a plan view of the display device 100 shown in FIG. 8 (and/or in a view toward a portion of the image-displaying front surface 101). Specifically, when the display device 100 is in the first folding state, the light control parts 143 overlapping the first display portion 1DA overlap and cross the light control part 143 overlapping the second display portion 2DA (see FIG. 8). The overlapping and crossing light control parts 143 may control the light outputted from the first display portion 1DA and the second display portion 2DA to be outputted in only one or a few predetermined directions and to be blocked (and/or absorbed) in other directions.

Accordingly, even though the first display portion 1DA and the second display portion 2DA overlap each other when the display device 100 is in the first folding state, respective images of the first display portion 1DA and the second display portion 2DA are viewable to a user at respective portions of the image-displaying front surface 101, but are blocked by the overlapping and crossing light control parts 143, such that the images do not overlap or interfere with each other.

Figure 9:
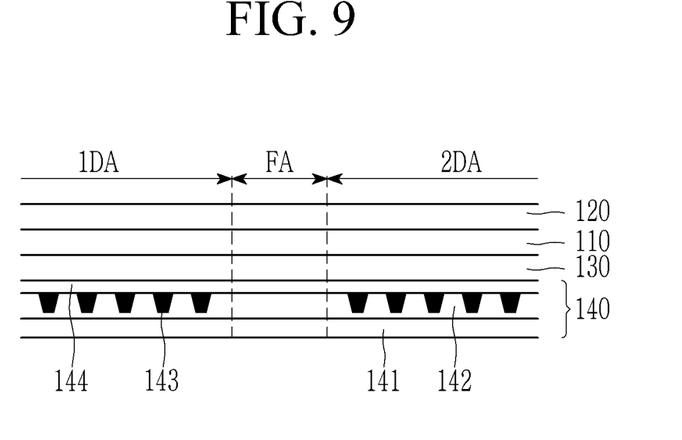
FIG. 9 illustrates a schematic cross-sectional view of a display device in an unfolded state according to an embodiment.

FIG. 9 illustrates a schematic cross-sectional view of a display device in an unfolded state according to an embodiment.

Referring to FIG. 9, the display device differs from the display device illustrated in FIG. 4 in that a light control film 140 overlaps the folding portion FA of the display panel 110 (and of the display device), and the remaining structures are substantially the same or similar. Description of the same structures may not be repeated.

The light control film 140 overlaps each of the first display portion 1DA, the second display portion 2DA, and the folding portion FA of the display panel 110 (and of the display device). Light control parts 143 may not be disposed at the folding portion FA. Each of the base film 141, the transparent film 142, and the adhesive layer 144 may overlap the folding portion FA.

Each of FIG. 10, FIG. 11, FIG. 12, and FIG. 13 illustrates a schematic plan view of a display device according to an embodiment. Each of FIG. 10 to FIG. 13 schematically illustrates a rear surface of a display device (opposite an image-displaying surface of the display device) when the display device is in an unfolded state.

Figure 10:
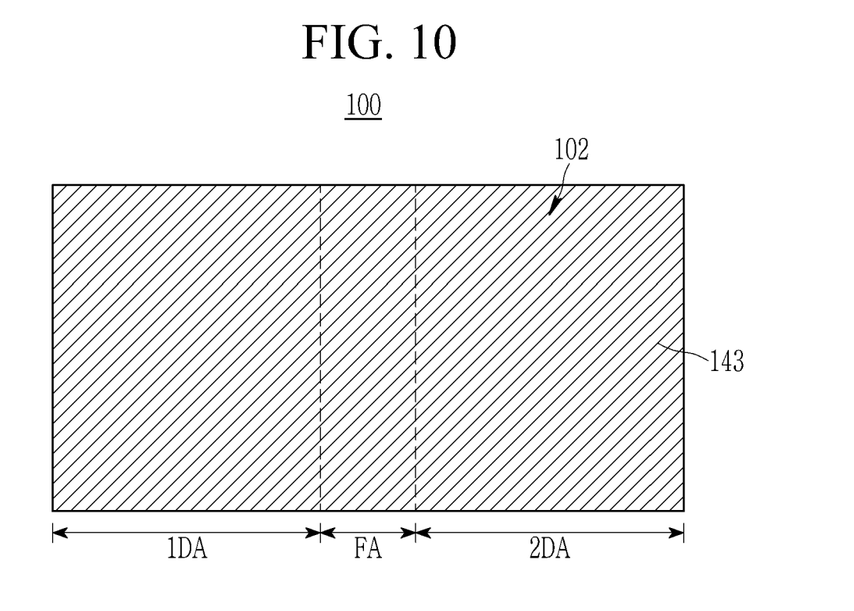
FIG. 10 illustrates a schematic plan view of a display device in an unfolded state according to an embodiment.

Referring to FIG. 10, the display device 100 differs from the display device illustrated in FIG. 3 in that some light control parts 143 (or third-set light control members) overlap the folding portion FA.

Light control parts 143 obliquely extend in the same direction in the first display portion 1DA, the second display portion 2DA, and the folding portion FA. Although not shown, a base film, a transparent film, and an adhesive layer overlap the folding portion FA.

Figure 11:
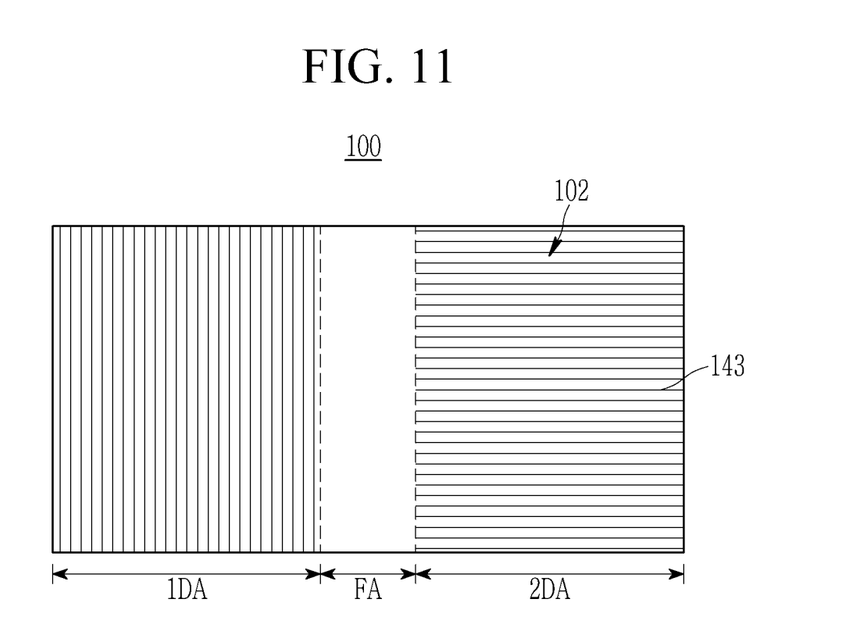
FIG. 11 illustrates a schematic plan view of a display device in an unfolded state according to an embodiment.

Referring to FIG. 11, the display device 100 differs from the display device illustrated in FIG. 3 in directions in which light control parts 143 extend.

The light control parts 143 (or first-set light control members) overlapping the first display portion 1DA may extend perpendicular to the light control part 143 (or first-set light control members) overlapping the second display portion 2DA in a plan view of the display device. The light control parts 143 overlapping the first display portion 1DA extend parallel to each other, and the light control parts 143 overlapping the second display portion 2DA extend parallel to each other. For example, as shown in FIG. 11, the light control parts 143 overlapping the first display portion 1DA extend in a vertical direction, and the light control parts 143 overlapping the second display portion 2DA extend in a horizontal direction. In an embodiment, the light control parts 143 overlapping the first display portion 1DA may extend in the vertical direction, and the light control parts 143 overlapping the second display portion 2DA may extend in the horizontal direction.

Thus, in the first folding state of the display device 100, the light control part 143 overlapping the first display portion 1DA may overlap and cross the light control part 143 overlapping the second display portion 2DA, for blocking unwanted light transmission.

Figure 12:
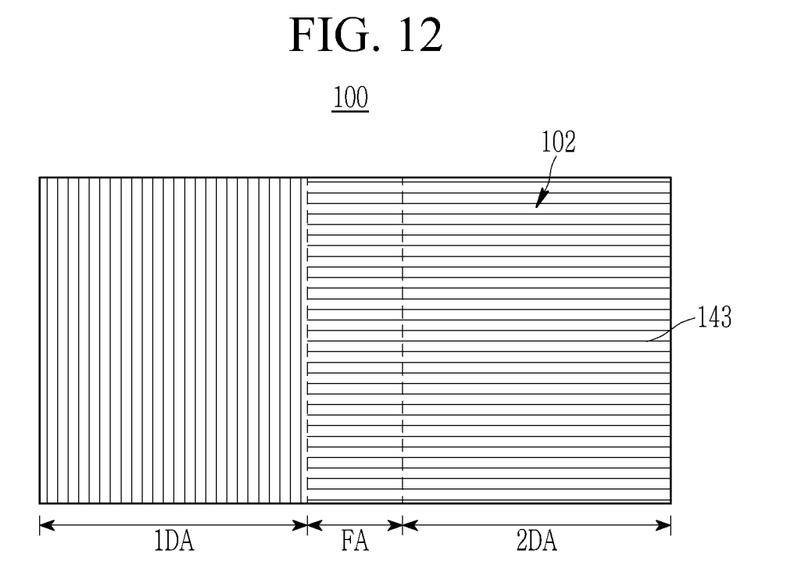
FIG. 12 illustrates a schematic plan view of a display device in an unfolded state according to an embodiment.

Referring to FIG. 12, the display device 100 differs from the display device illustrated in FIG. 11 in that light control parts 143 overlap the folding portion FA.

Light control parts 143 overlap the first display portion 1DA, the second display portion 2DA, and the folding portion FA. The light control parts 143 overlapping the first display portion 1DA extend in the vertical direction, the light control parts 143 overlapping the second display portion 2DA extend in the horizontal direction, and the light control parts 143 overlapping the folding portion FA extend in the horizontal direction. The light control part 143 overlapping the first display portion 1DA may extend perpendicular to the light control parts 143 overlapping the second display portion 2DA and may extend perpendicular to the light control parts 143 overlapping the folding portion FA.

Thus, in the first folding state of the display device 100, the light control parts 143 overlapping the first display portion 1DA may overlap and cross the light control parts 143 overlapping the second display portion 2DA, for blocking unwanted light transmission.

Figure 13:
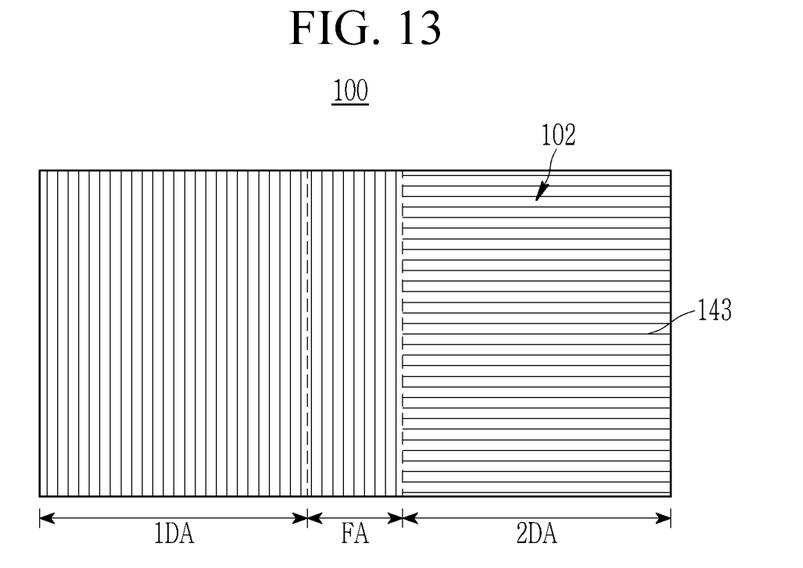
FIG. 13 illustrates a schematic plan view of a display device in an unfolded state according to an embodiment.

Referring to FIG. 13, the display device 100 differs from the display device illustrated in FIG. 11 in that light control parts 143 overlap the folding portion FA.

Light control part 143 overlap the first display portion 1DA, the second display portion 2DA, and the folding portion FA. The light control parts 143 overlapping the first display portion 1DA extends in the vertical direction, the light control parts 143 overlapping the folding portion FA extend in the vertical direction, and the light control parts 143 overlapping the second display portion 2DA extend in the horizontal direction. The light control parts 143 overlapping the first display portion 1DA and the light control parts 143 overlapping the folding portion FA extend perpendicular to the light control part 143 overlapping the second display portion 2DA.

Thus, in the first folding state of the display device 100, the light control parts 143 overlapping the first display portion 1DA may overlap and cross the light control parts 143 overlapping the second display portion 2DA, for blocking unwanted light transmission.

In each of FIG. 10 to FIG. 13, the light control part 143 is disposed on the rear surface of the display device. In embodiments, the light control part 143 may be disposed on the front surface of the display device.

While example embodiments have been described, practical embodiments are not limited to the described embodiments. Practical embodiments are intended to cover various modifications and equivalent arrangements within the scope of the appended claims.

What is claimed is:

1. A foldable display device comprising:
   a display panel including a first display portion, a second display portion, and a folding portion disposed between the first display portion and the second display portion, the folding portion configured to display at least a portion of an image; and
   light control members disposed only in the first display portion and the second display portion, the light control members comprising:
   first-set light control members overlapping the first display portion and extending parallel to each other; and
   second-set light control members overlapping the second display portion and extending parallel to each other, the first-set light control members and the second-set light control members consisting of linear members that are spaced apart from one another,
   wherein when the display panel is folded such that the first-set light control members and the second-set light control members are positioned between the first display portion and the second display portion, the first-set light control members cross the second-set light control members in a plan view of the foldable display device, so that respective images of the first display portion and the second display portion are blocked and not overlapped,
   wherein the first-set light control members and the second-set light control members each include light blockers or light absorbers,
   wherein when the display panel is unfolded, the first-set light control members extend parallel to the second-set light control members and extend obliquely relative to an edge of the display panel.

2. The foldable display device of claim 1, wherein
   the first-set light control members and the second-set light control members are positioned between the first display portion and the second display portion when the display panel is in a first folded state, and
   the first display portion and the second display portion are positioned between the first-set light control members and the second-set light control members when the display panel is in a second folded state.

3. The foldable display device of claim 1, wherein each of the first-set light control members includes a black resin.

4. The foldable display device of claim 1, further comprising:
   a transparent film overlapping the first display portion and including first-set grooves, wherein
   the first-set light control members are respectively disposed in the first-set grooves.

5. The foldable display device of claim 4, wherein the transparent film further overlaps the folding portion.

6. The foldable display device of claim 4, further comprising:
   a base film formed of a polymer material, wherein the first-set light control members are positioned between the base film and the first display portion.

7. The foldable display device of claim 6, wherein the base film overlaps the first display portion and overlaps the folding portion.

8. The foldable display device of claim 6, wherein portions of the transparent film are positioned between the first-set light control members and the base film, directly contact the first-set light control members, and directly contact the base film.

9. The foldable display device of claim 4, further comprising:
   an adhesive layer positioned between the first-set light control members and the first display portion and directly contacting at least one of the first-set light control members and the transparent film.

10. The foldable display device of claim 9, wherein the adhesive layer directly contacts the first-set light control members and directly contacts the transparent film.

11. The foldable display device of claim 1, further comprising: an adhesive layer positioned between the first-set light control members and the first display portion and directly contacting the first-set light control members.

12. The foldable display device of claim 11, wherein
   the adhesive layer overlaps the first display portion and overlaps the folding portion.

13. The foldable display device of claim 1, wherein the display panel is a transparent display panel, and the first-set light control members are light blockers.

* * * * *